US009904869B2

(12) United States Patent
Wang et al.

(10) Patent No.: US 9,904,869 B2
(45) Date of Patent: *Feb. 27, 2018

(54) AUTOMATICALLY COMPUTING EMOTIONS AROUSED FROM IMAGES THROUGH SHAPE MODELING

(71) Applicant: The Penn State Research Foundation, University Park, PA (US)

(72) Inventors: James Z. Wang, State College, PA (US); Xin Lu, State College, PA (US); Poonam Suryanarayan, San Francisco, CA (US); Reginald B. Adams, Jr., Pennsylvania Furnace, PA (US); Jia Li, State College, PA (US); Michelle Newman, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,331

(22) Filed: Dec. 30, 2016

(65) Prior Publication Data

US 2017/0109603 A1    Apr. 20, 2017

Related U.S. Application Data

(63) Continuation of application No. 14/809,499, filed on Jul. 27, 2015, now Pat. No. 9,558,425, which is a (Continued)

(51) Int. Cl.
*G06K 9/46* (2006.01)
*G06T 7/60* (2017.01)

(52) U.S. Cl.
CPC ............. *G06K 9/4671* (2013.01); *G06T 7/60* (2013.01); *G06T 2207/10004* (2013.01)

(58) Field of Classification Search
None
See application file for complete search history.

(56) References Cited

U.S. PATENT DOCUMENTS 8,922,553 B1    12/2014 Tena et al.
2008/0085032 A1    4/2008 Cerosaletti et al.
(Continued)

OTHER PUBLICATIONS

Mingqiang Yang, Kidiyo Kpalma, Joseph Ronsin, A Survey of Shape Feature Extraction Techniques, 2008, Pattern Recognition, IN-TECH, p. 43-90 <<hal-00446037>>.*

(Continued)

*Primary Examiner* — Michael J Cobb
(74) *Attorney, Agent, or Firm* — Dinsmore & Shohl LLP

(57) ABSTRACT

Shape features in natural images influence emotions aroused in human beings. An in-depth statistical analysis helps to understand the relationship between shapes and emotions. Through experimental results on the International Affective Picture System (IAPS) dataset, evidence is presented as to the significance of roundness-angularity and simplicity-complexity on predicting emotional content in images. Shape features are combined with other state-of-the-art features to show a gain in prediction and classification accuracy. Emotions are modeled from a dimensional perspective in order to predict valence and arousal ratings, which have advantages over modeling the traditional discrete emotional categories. Images are distinguished vis-a-vis strong emotional content from emotionally neutral images with high accuracy. All of the methods and steps disclosed herein are implemented on a programmed digital computer, which may be a stand-alone machine or integrated into another piece of equipment such as a digital still or video camera including, in all embodiments, portable devices such as smart phones.

9 Claims, 19 Drawing Sheets

Related U.S. Application Data continuation-in-part of application No. 13/963,039, filed on Aug. 9, 2013, now abandoned.

(60) Provisional application No. 61/683,845, filed on Aug. 16, 2012.

(56) References Cited

U.S. PATENT DOCUMENTS

| | | | |
|---|---|---|---|
| 2008/0285860 A1 | 11/2008 | Datta et al. | |
| 2009/0285456 A1 | 11/2009 | Moon et al. | |
| 2010/0007665 A1* | 1/2010 | Smith | G06T 13/40 345/473 |
| 2010/0211966 A1 | 8/2010 | Zang et al. | |
| 2011/0313972 A1 | 12/2011 | Albouze | |
| 2012/0268612 A1 | 10/2012 | Wang et al. | |
| 2013/0011070 A1 | 1/2013 | Datta et al. | |

OTHER PUBLICATIONS

Aronoff, J., How we recognize angry and happy emotion in people, places, and things, *Cross-Cultural Research*, 40(1):83-105, 2006.

Baboo, S. et al., Face Emotion Analysis Using Gabor Features in Image Database for Crime Investigation, International Journal of Data Engineering, (IJDE), 2(2): 42-52, 2011.

Bar, M. et al., Humans prefer curved visual objects, *Psychological Science*, 17(8):645-648, 2006.

Bartlett, M. et al., Image Representations for Facial Expression Coding, Advances in Neural Information Processing Systems, 12, 2000.

Datta, R. et al., Studying aesthetics in photographic images using a computational approach, in *ECCV*, pp. 288-301, 2006.

Datta, R. et al., Algorithmic inferencing of aesthetics and emotion in natural image: An exposition, *ICIP*, pp. 105-108, 2008.

Han, B. et al., SMERS: Music Emotion Recognition Using Support Vector Recognition, 10th International Society for Music Information Retrieval Conference, pp. 651-56, 2009.

Hanjalic, A. et al., Affective Video Content Representation and Modeling, IEEE Transactions on Multimedia, 7(1): 143-54, 2005.

Huq, A. et al., Automated Music Emotion Recognition: A Systematic Evaluation, Journal of New Music Research, 39(3): 227-44, 2010.

Joshi, D. et al., Aesthetics and emotions in images, *IEEE Signal Processing Magazine*, 28(5):94-115, 2011.

Kim, J. et al., Emotion Recognition Based on Physiological Changes in Music Listening, IEEE Transactions on Pattern Analysis and Machine Intelligence, 30(12): 2067-82, 2008.

Liu, N. et al., Associating Textual Features with Visual Ones to Improve Affective Image Classification, Affective Computing and Intelligent Interaction, Lecture Notes in Computer Science, 6974: 195-204, 2011.

Machajdik, J., Affective image classification using features inspired by psychology and art theory, ACM MM, pp. 83-92, 2010.

Suzuki, K. et al., A Similarity-Based Neural Network for Facial Expression Analysis, Pattern Recognition Letters, 28: 1104-1111, 2007.

\* cited by examiner

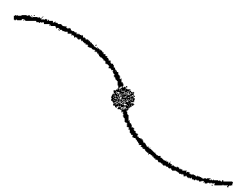
FIG. 7A  FIG. 7B
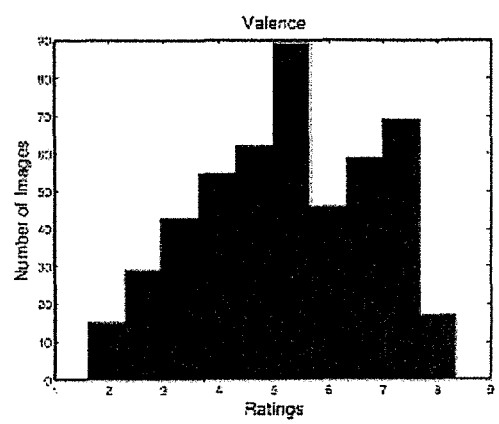
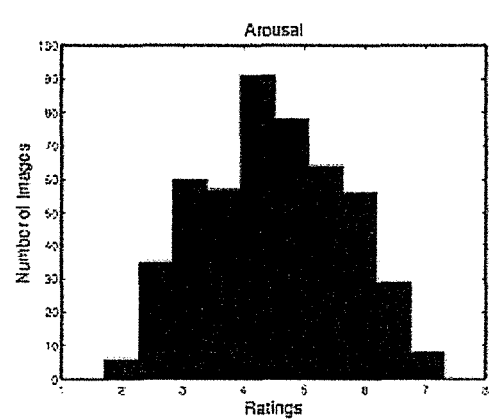
FIG. 14A  FIG. 14B

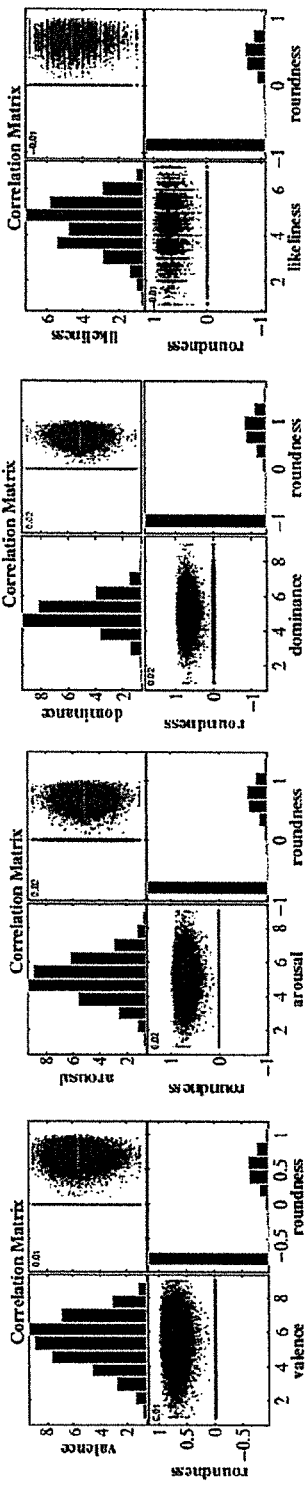
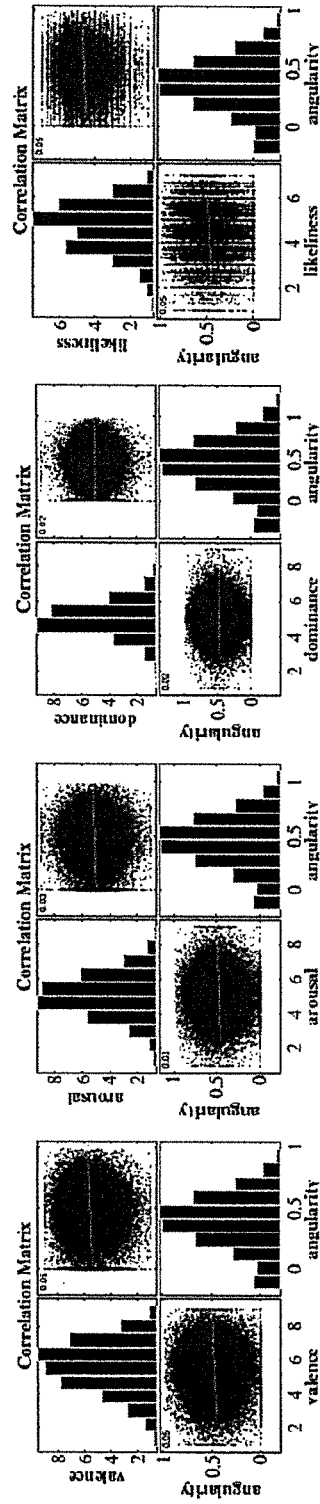
FIG. 24A  FIG. 24B  FIG. 24C  FIG. 24D
FIG. 25A  FIG. 25B  FIG. 25C  FIG. 25D

US 9,904,869 B2

AUTOMATICALLY COMPUTING EMOTIONS AROUSED FROM IMAGES THROUGH SHAPE MODELING

REFERENCE TO RELATED APPLICATIONS

This application is a continuation of U.S. patent application Ser. No. 14/809,499, filed Jul. 27, 2015, which is a continuation-in-part of U.S. patent application Ser. No. 13/963,039, filed Aug. 9, 2013, now abandoned, which claims priority from U.S. Provisional Patent Application Ser. No. 61/683,845, filed Aug. 16, 2012, the entire content of all of which is incorporated herein by reference.

GOVERNMENT SUPPORT

This invention was made with government support under Contract Nos. 1110970 and 0821527 awarded by National Science Foundation. The Government has certain rights in the invention.

FIELD OF THE INVENTION

This invention relates generally to computer-based image processing and, in particular, to automatically modeling the emotional content of an image from a dimensional perspective to predict valence and arousal ratings.

BACKGROUND OF THE INVENTION

The study of human visual preferences and the emotions imparted by various works of art and natural images has long been an active topic of research in the field of visual arts and psychology. A computational perspective to this problem has interested many researchers and resulted in articles on modeling the emotional and aesthetic content in images [10, 11, 13]. However, there is a wide gap between what humans can perceive and feel and what can be explained using current computational image features. Bridging this gap is considered the "holy grail" of computer vision and the multimedia community.

There have been many psychological theories suggesting a link between human affective responses and the low-level features in images apart from the semantic content. For example, studies indicate that roundness and complexity of shapes are fundamental to understanding emotions. Studies of roundness indicate that geometric properties of visual displays convey emotions like anger and happiness. Bar et al. [5] confirm the hypothesis that curved contours lead to positive feelings and that sharp transitions in contours trigger a negative bias. With respect to the complexity of shapes, and as enumerated in various works of art, humans visually prefer simplicity. Any stimulus pattern is always perceived in the most simplistic structural setting. Though the perception of simplicity is partially subjective to individual experiences, it can also be highly affected by two objective factors, parsimony and orderliness. Parsimony refers to the minimalistic structures that are used in a given representation, whereas orderliness refers to the simplest way of organizing these structures [3].

These findings provide an intuitive understanding of the low-level image features that motivate the affective response, but the small scale of studies from which the inferences have been drawn makes the results less convincing. In order to make a fair comparison of observations, psychologists created the standard International Affective Picture System (IAPS) [15] dataset by obtaining user ratings on three basic dimensions of affect, namely valence, arousal, and dominance (FIG. 1). However, the computational work on the IAPS dataset to understand the visual factors that affect emotions has been preliminary. Researchers [9, 11, 18, 23, 25, 26] investigated factors such as color, texture, composition, and simple semantics to understand emotions, but have not quantitatively addressed the effect of perceptual shapes.

Previous work [11, 26, 18] predicted emotions aroused by images mainly through training classifiers on visual features to distinguish categorical emotions, such as happiness, anger, and sad. Low-level stimuli such as color and composition have been widely used in computational modeling of emotions. Affective concepts were modeled using color palettes, which showed that the bag of colors and Fisher vectors (i.e., higher order statistics about the distribution of local descriptors) were effective [9].

The study that did explore shapes by Zhang et al. [27] predicted emotions evoked by viewing abstract art images through low-level features like color, shape, and texture. However, this work only handles abstract images, and focused on the representation of textures with little accountability of shape. Zhang et al. characterized shape through Zernike features, edge statistics features, object statistics, and Gabor filters.

Emotion-histogram and bag-of-emotion features were used to classify emotions by Solli et al. [24]. These emotion metrics were extracted based on the findings from psycho-physiological experiments indicating that emotions can be represented through homogeneous emotion regions and transitions among them.

The first work that comprehensively modeled categorical emotions, Machajdik and Hanbury [18] used color, texture, composition, content, and semantic level features such as number of faces to model eight discrete emotional categories. Besides the eight basic emotions, to model categorized emotions, adjectives or word pairs were used to represent human emotions. The earliest work based on the Kansei system employs 23 word pairs (e.g., like-dislike, warm-cool, cheerful-gloomy) to establish the emotional space [23]. Along the same lines, researchers enumerated more word pairs to reach a universal, distinctive, and comprehensive representation of emotions in Wang et al. [25]. Yet, the aforementioned approaches of emotion representation ignore the interrelationship among types of emotions.

SUMMARY OF THE INVENTION

This invention represents an attempt to systematically investigate how perceptual shapes contribute to emotions aroused from images through modeling the visual properties of roundness, angularity and simplicity using shapes. Unlike edges or boundaries, shapes are influenced by the context and the surrounding shapes influence the perception of any individual shape [3]. To model these shapes in the images, the disclosed framework statistically analyzes the line segments and curves extracted from strong continuous contours. Investigating the quantitative relationship between perceptual shapes and emotions aroused from images is non-trivial. First, emotions aroused by images are subjective. Thus, individuals may not have the same response to a given image, making the representation of shapes in complex images highly challenging. Second, images are not composed of simple and regular shapes, making it difficult to model the complexity existing in natural images [3].

Leveraging the proposed shape features, the method seeks to automatically distinguish the images with strong emotional content from emotionally neutral images. In psychology, emotionally neutral images refer to images which evoke very weak or no emotions in humans.

The approach models emotions from a non-\break categorical or discrete emotional perspective. In previous work, emotions were distinctly classified into categories like anger, fear, disgust, amusement, awe, and contentment\break among others. This invention represents the first to predict emotions aroused from images by adopting a dimensional representation (FIG. 2). Valence represents the positive or negative aspect of human emotions, where common emotions, like joy and happiness, are positive, whereas anger and fear are negative. Arousal describes the human physiological state of being reactive to stimuli. A higher value of arousal indicates higher excitation. Dominance represents the controlling nature of the emotion. For instance, anger can be more controlling than fear. Researchers [2, 12, 28] have investigated the emotional content of videos through the dimensional approach. Their emphasis was on the accommodation of the change in features over time rather than low-level feature improvement. However, static images, with less information, are often more challenging to interpret. Low-level features need to be punctuated.

This invention adopts the dimensional approaches of emotion motivated by recent studies in psychology, which argued for the strengths of dimensional approaches. According to Bradley and Lang [6], categorized emotions do not provide a one-to-one relationship between the content and emotion of an image since participants perceive different emotions in the same image. This highlights the utility of a dimensional approach, which controls for the intercorrelated nature of human emotions aroused by images. From the perspective of neuroscience studies, it has been demonstrated that the dimensional approach is more consistent with how the brain is organized to process emotions at their most basic level [14, 17]. Dimensional approaches also allow the separation of images with strong emotional content from images with weak emotional content.

Points of novelty of the invention include the ability to systematically investigate the correlation between visual shapes and emotions aroused from images. The concepts of roundness-angularity and simplicity-complexity are quantitatively modeled from the perspective of shapes using a dimensional approach, and images with strong emotional content are distinguished from those with weak emotional content. Importantly, the method can automatically compute the valence and/or arousal coordinates of an image in the dimensional space model of emotions.

Building upon the shape features, we have also investigated three visual characteristics of complex scenes that evoked human emotion utilizing a large collection of ecologically valid image stimuli. Three new constructs were developed that mapped the visual content to the scales of roundness, angularity, and simplicity. Results of correlational analyses, between each construct and each dimension of emotional responses, showed that some of the correlations are statistically significant, e.g., simplicity and valence, angularity and valence. And classification results demonstrated the capacity of the three constructs in classifying both dimensions of emotion. Interestingly, by combining with color features, the three constructs showed comparable classification accuracy on distinguishing positive emotions from negative ones as a set of 200 texture, composition, facial, and shape features. The invention may contribute to research regarding visual characteristics of complex scenes and human emotion from perspectives of visual arts, psychology, and computer science.

BRIEF DESCRIPTION OF THE DRAWINGS

FIG. 7A depicts a corner point;

FIG. 7B shows a point of inflexion;

FIG. 14A plots the valence distribution of ratings in IAPS;

FIG. 14B plots the arousal distribution of ratings in IAPS;

FIGS. 24A-24D show the correlation between roundness and valence, arousal, dominance, and likeliness in natural photographs;

FIGS. 25A-25D depict the correlation between angularity and valence, arousal, dominance, and likeliness in natural photographs.

DETAILED DESCRIPTION OF THE INVENTION

Figure 1:
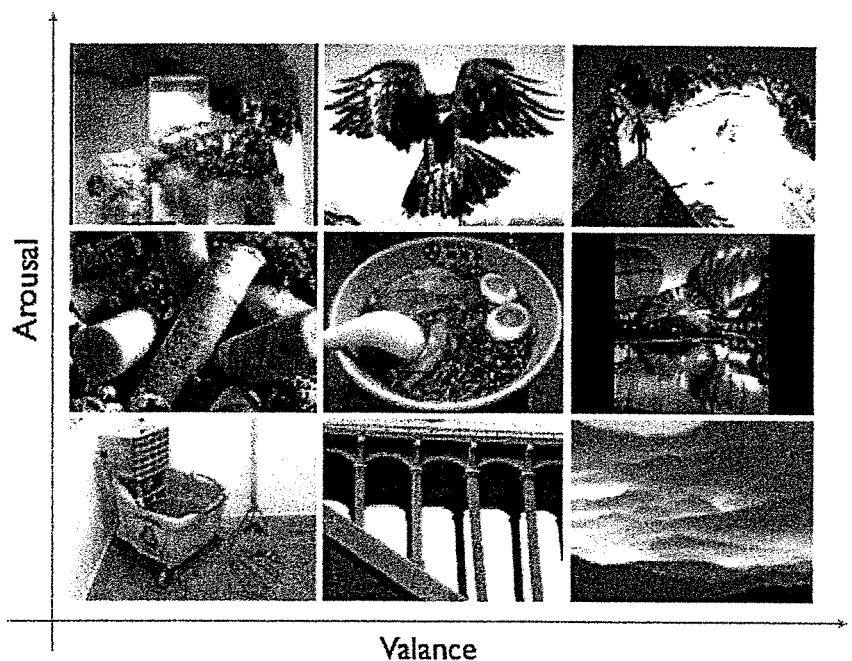
FIG. 1 shows example images derived from IAPS (The International Affective Picture System) dataset. Images with positive affect from left to right, and high arousal from bottom to top.
Figure 2:
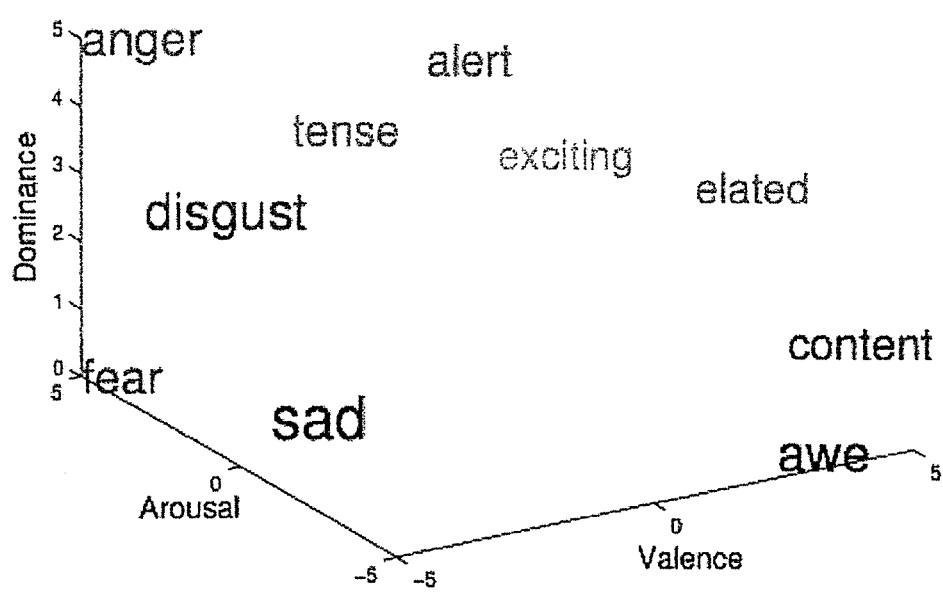
FIG. 2 is a dimensional representation of emotions and the location of categorical emotions in these dimensions (Valance, Arousal, and Dominance)
Figure 3:
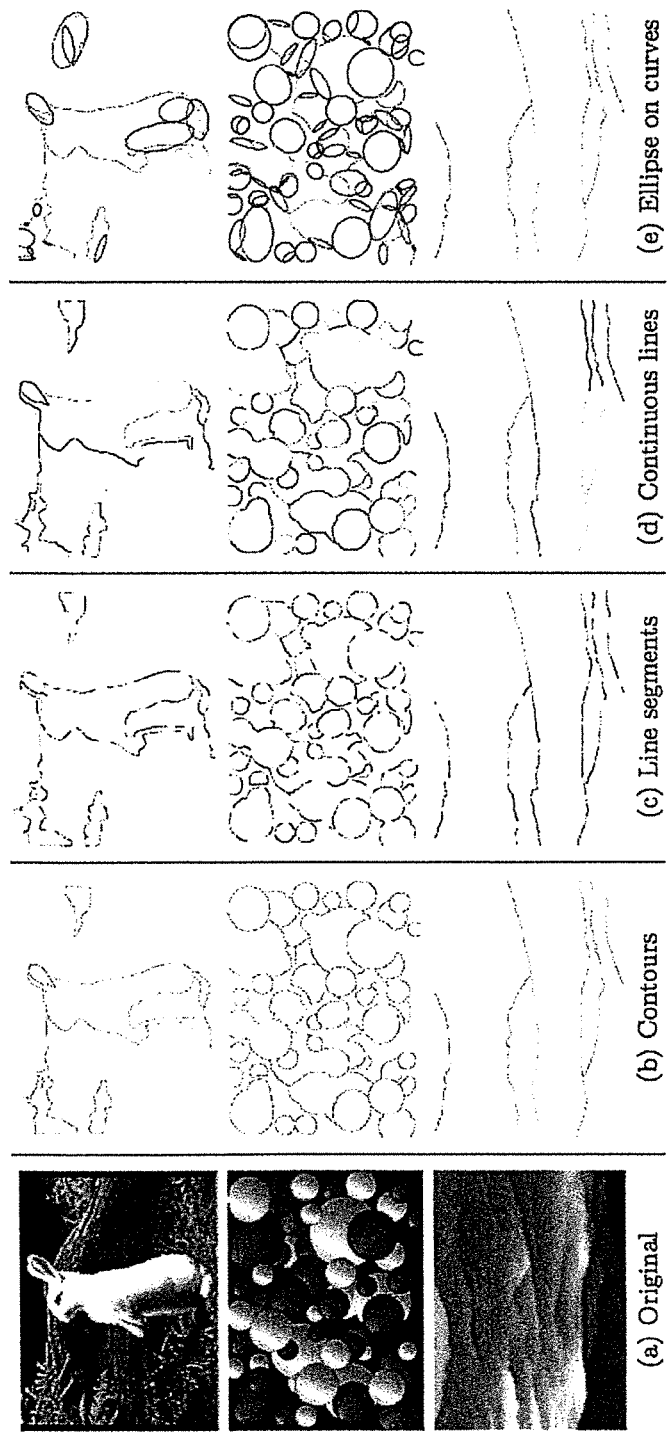
FIG. 3 shows perceptual shapes of images with high valance.
Figure 4:
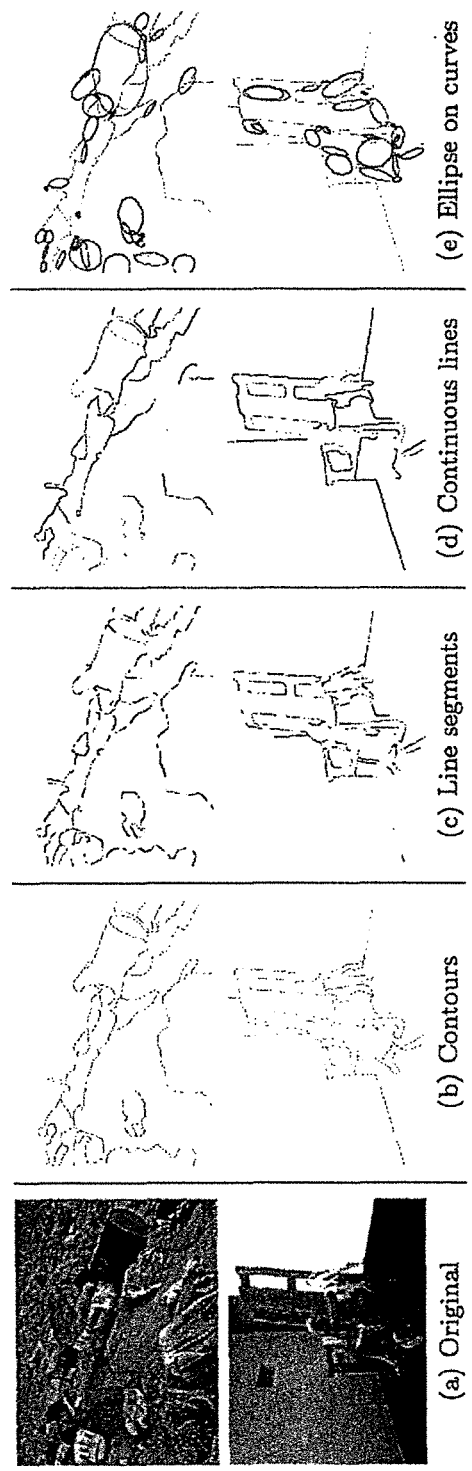
FIG. 4 shows perceptual shapes of images with low valance.
Figure 5:
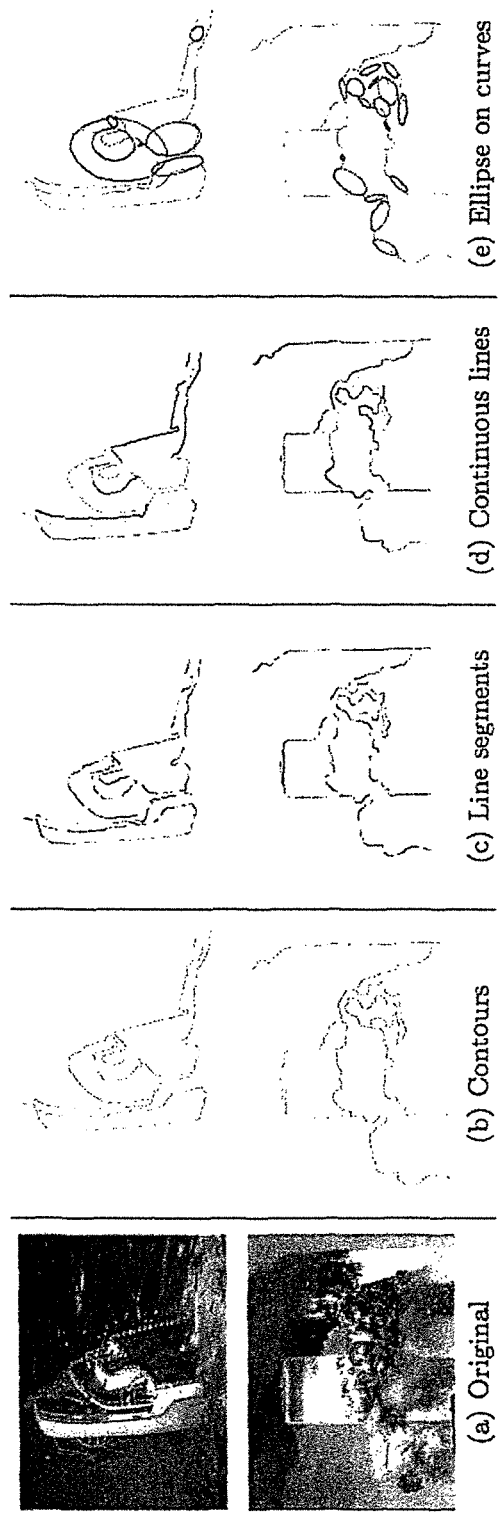
FIG. 5 shows perceptual shapes of images with high arousal.
Figure 6:
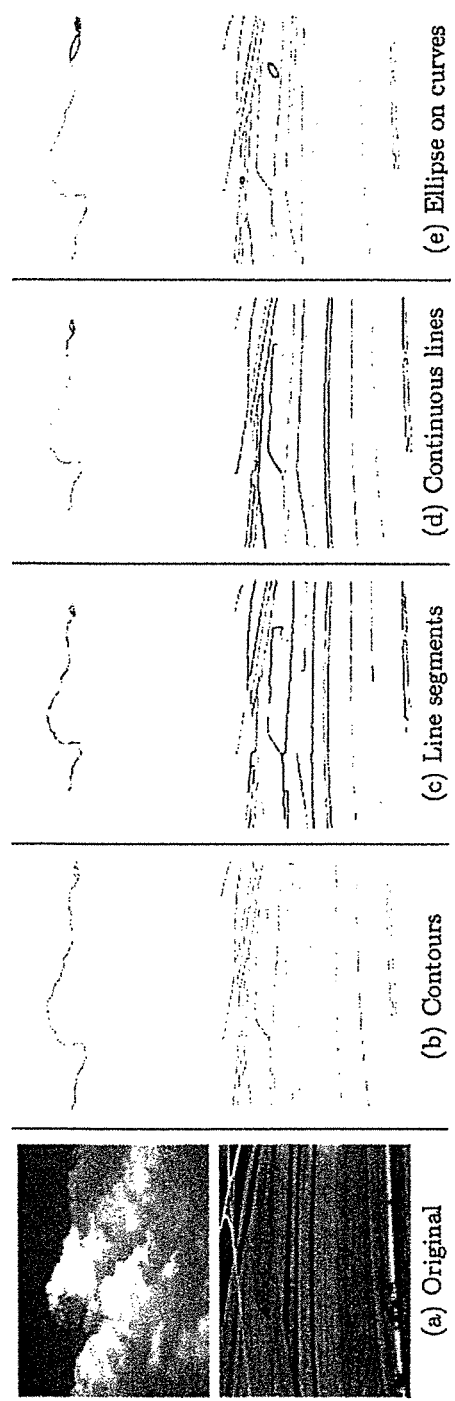
FIG. 6 shows perceptual shapes of images with low arousal.

In accordance with this invention, emotions evoked by images are captured by leveraging shape descriptors. Shapes in images are difficult to capture, mainly due to the perceptual and merging boundaries of objects which are often not easy to differentiate using even state-of-the-art segmentation or contour extraction algorithms. In contemporary computer vision literature [7, 20], there are a number of statistical representations of shape through characteristics like the straightness, sinuosity, linearity, circularity, elongation, orientation, symmetry, and the mass of a curve. We chose roundness-angularity and simplicity-complexity characteristics because they have been found previously by psychologists to influence the affect of human beings through controlled human subject studies. Symmetry is also known to effect emotion and aesthetics of images [22]. However, quantifying symmetry in natural images is challenging.

To make it more convenient to introduce the shape features proposed, the four terms used are defined as: line segments, angles, continuous lines, and curves. The framework for extracting perceptual shapes through lines and curves is derived from [8]. The contours are extracted using the algorithm in [1], which used color, texture, and brightness of each image for contour extraction. The extracted contours are of different intensities and indicate the algorithm's confidence on the presence of edges. Considering the temporal resolution of our vision system, we adopted a threshold of 40%. Example results are presented in FIGS. 3, 4, 5, and 6. Pixels with an intensity higher than 40% are treated equally, which results in the binary contour map presented in the second column. The last three columns show the line segments, continuous lines, and curves.

Line segments—Line segments refer to short straight lines generated by fitting nearby pixels. We generated line segments from each image to capture its structure. From the structure of the image, we propose to interpret the simplicity-complexity. We extracted locally optimized line segments by connecting neighboring pixels from the contours extracted from the image [16].

Angles—Angles in the image are obtained by calculating angles between each of any two intersecting line segments extracted previously. According to Julian Hochberg's theory [3], the number of angles and the number of different angles in an image can be effectively used to describe its simplicity-complexity. The distribution of angles also indicates the degree of angularity of the image. A high number of acute angles make an image more angular.

Continuous lines—Continuous lines are generated by connecting intersecting line segments having the same orientations with a small margin of error. Line segments of inconsistent orientations can be categorized as either corner points or points of inflexion. Corner points, shown in FIG. 7A, refer to angles that are lower than 90 degrees. Inflexion points, shown in FIG. 7B, refer to the midpoint of two angles with opposite orientations. Continuous lines and the degree of curving can be used to interpret the complexity of the image.

Curves—Curves are a subset of continuous lines, the collection of which are employed to measure the roundness of an image. To achieve this, we consider each curve as a section of an ellipse, thus we use ellipses to fit continuous lines. Fitted curves are represented by parameters of its corresponding ellipses.

Capturing Emotion from Shapes

For decades, numerous theories have been promoted that are focused on the relationship between emotions and the visual characteristics of simplicity, complexity, roundness, and angularity. Despite these theories, researchers have yet to resolve how to model these relationships quantitatively. We propose to use shape features to capture those visual characteristics. By identifying the link between shape features and emotions, we are able to determine the relationship between the aforementioned visual characteristics and emotions.

We now present the details of the proposed shape features: line segments, angles, continuous lines, and curves. A total of 219 shape features are summarized in Table I.

TABLE I

Summary of shape features.

| Category | Short Name | # |
| --- | --- | --- |
| Line Segments | Orientation | 60 |
|  | Length | 11 |
|  | Mass of the image | 4 |
| Continuous Lines | Degree of curving | 14 |
|  | Length span | 9 |
|  | Line count | 4 |
|  | Mass of continuous lines | 4 |
| Angles | Angle count | 3 |
|  | Angular metrics | 35 |
| Curves | Fitness | 14 |
|  | Circularity | 17 |
|  | Area | 8 |
|  | Orientation | 14 |
|  | Mass of curves | 4 |
|  | Top round curves | 18 |

Line Segments

Psychologists and artists have claimed that the simplicity-complexity of an image is determined not only by lines or curves, but also by its overall structure and support [3]. Based on this idea, we employed line segments extracted from images to capture their structure. Particularly, we used the orientation, length, and mass of line segments to determine the complexity of the images.

Orientation—To capture an overall orientation, we employed statistical measures of minimum (min), maximum (max), 0.75 quantile, 0.25 quantile, the difference between 0.75 quantile and 0.25 quantile, the difference between max and min, sum, total number, median, mean, and standard deviation (we will later refer to these as {statistical measures}), and entropy. We experimented with both 6- and 18-bin histograms. The unique orientations were measured based on the two histograms to capture the simplicity-complexity of the image.

Among all line segments, horizontal lines and vertical lines are known [3] to be static and to represent the feelings of calm and stability within the image. Horizontal lines suggest peace and calm, whereas vertical lines indicate strength. To capture the emotions evoked by these characteristics, we counted the number of horizontal lines and vertical lines through an 18-bin histogram.

The orientation θ, of horizontal lines fall within $0°<θ<10°$ or $170°<θ<180°$, and $80°<θ<100°$ for vertical lines.

Length—The length of line segments reflects the simplicity of images. Images with simple structure might use long lines to fit contours, whereas complex contours have shorter lines. We characterized the length distribution by calculating the {statistical measures} of lengths of line segments within the image.

Mass of the image—The centroid of line segments may indicate associated relationships among line segments within the visual design [3]. Hence, we calculate the mean and standard deviation of the x and y coordinates of the line segments to find the mass of each image.

Figure 8:
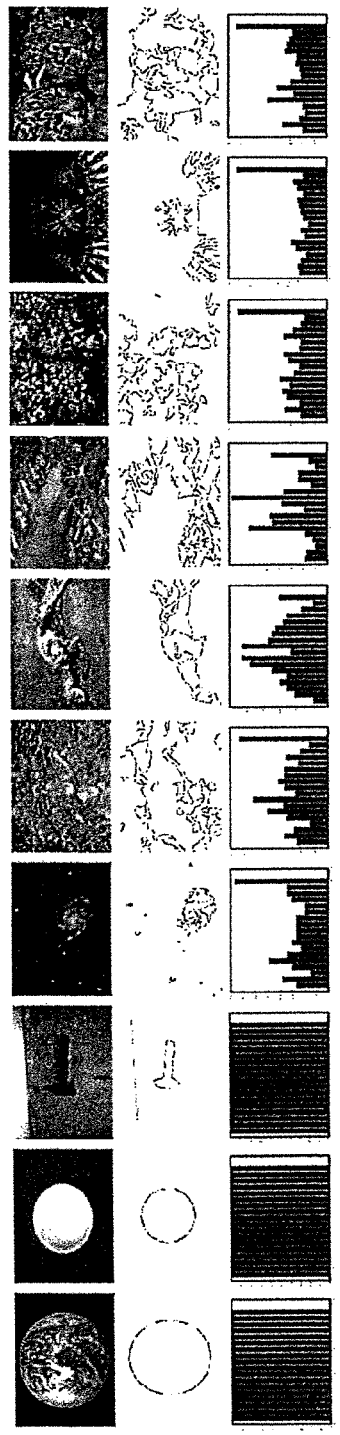
FIG. 8 provides images with low mean value of the length of line segments and their associated orientation histograms. The first row is the original images; the second row shows the line segments; and the third row shows the 18-bin histogram for line segments in the images.
Figure 9:
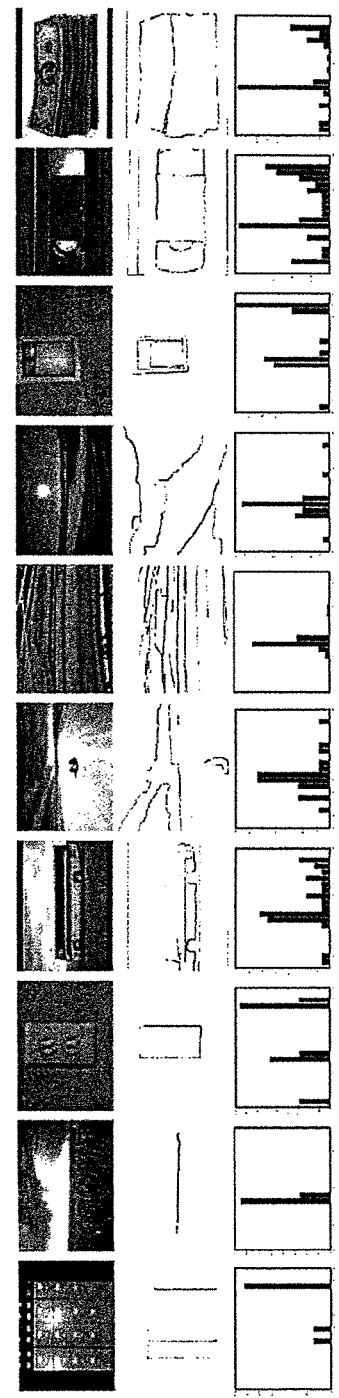
FIG. 9 provides images with high mean value of the length of line segments and their associated orientation histograms. The first row is the original images; the second row shows the line segments; and the third row shows the 18-bin histogram for line segments in the images.

Some of the example images and their features are presented in FIGS. 8 and 9. FIG. 8 presents the ten lowest mean values of the length of line segments. The first row shows the original images, the second row shows the line segments extracted from these images and the third row shows the $18$-bin histogram for line segments in the images. The 18 bins refer to the number of line segments with an orientation of [−90+10(i−1), −90+10i) degrees where i∈{1, 2, . . . , 18}. Similarly, FIG. 9 presents the ten highest mean values of the length of line segments.

These two figures indicate that the length or the orientation cannot be examined separately to determine the simplicity-complexity of the image. Lower mean values of the length of line segments might refer to either simple images such as the first four images in FIG. 8 or highly complex images such as the last four images in that figure. The histogram of the orientation of line segments helps us to distinguish the complex images from simple images by examining variation of values in each bin.

Angles

Angles are important elements in analyzing the simplicity-complexity and the angularity of an image. We capture the visual characteristics from angles through two perspectives.

Angle count—We first calculate the two quantitative features claimed by Julian Hochberg, who has attempted to define simplicity (he used the value-laden term "figural goodness") via information theory: "The smaller the amount of information needed to define a given organization as compared to the other alternatives, the more likely that the figure will be so perceived" [3]. Hence this minimal information structure is captured using the number of angles and the percentage of unique angles in the image.

Angular metrics—We use the {statistical measures} to extract angular metrics. We also calculate the 6- and 18-bin histograms on angles and their entropies.

Figure 10:
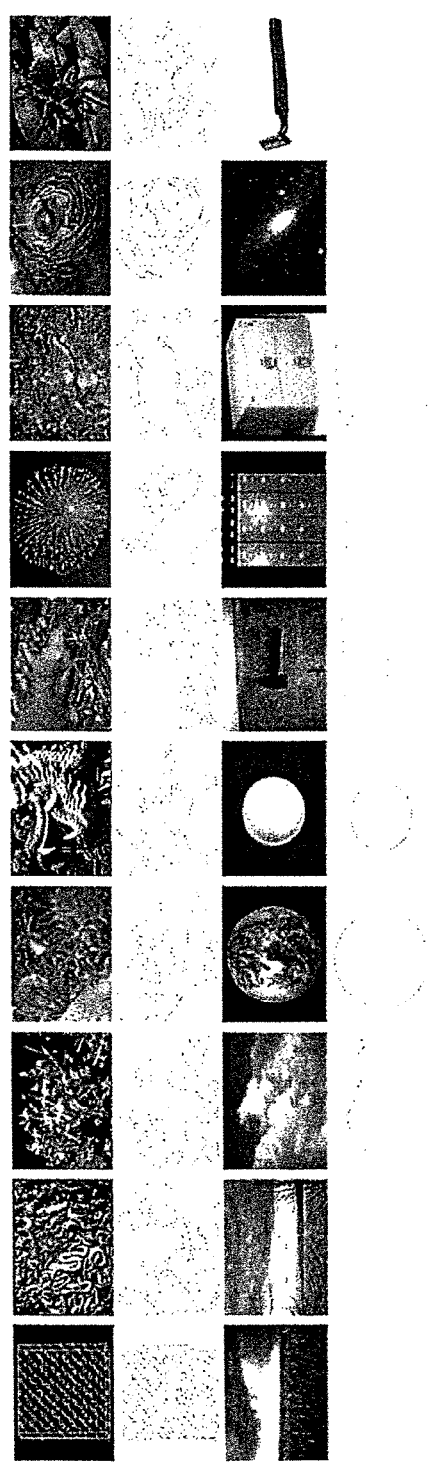
FIG. 10 presents images with highest and lowest number of angles.
Figure 11:
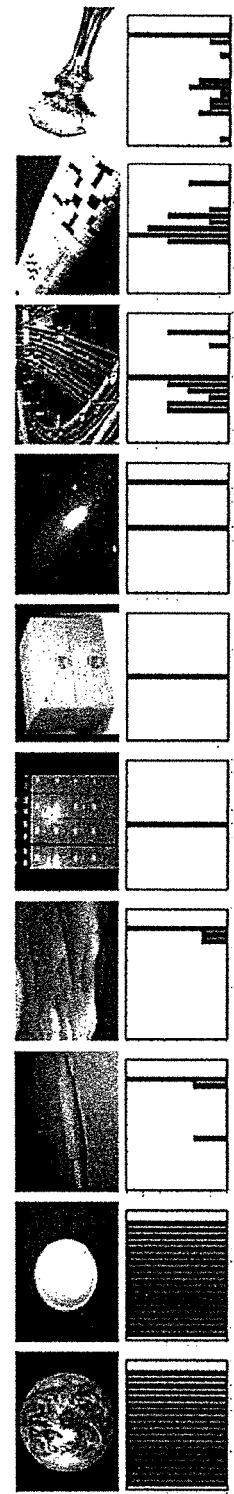
FIG. 11 illustrates the distribution of angles in images.

Some of the example images and features are presented in FIGS. 10 and 11. Images with lowest and highest number of angles are shown along with their corresponding contours in FIG. 10. These examples show promising relationships between angular features and simplicity-complexity of the image. Example results for the histogram of angles in the image are presented in FIG. 11. The 18 bins refer to the number of line segments with an orientation in [10(i−1), 10i) degrees where i∈{1, 2, . . . , 18}.

Continuous Lines

We attempt to capture the degree of curvature from continuous lines, which has implications for the simplicity-complexity of images. We also calculated the number of continuous lines, which is the third quantitative feature specified by Julian Hochberg [3]. For continuous lines, open/closeness are factors affecting the simplicity-complexity of an image. In the following, we focus on the calculation of the degree of curving, the length span value, and the number of open lines and closed lines. The length span refers to the highest Euclidean distance among all pairs of points on the continuous lines.

$$LengthSpan(l) = \max_{p_i \in l, p_j \in l} EuclideanDist(p_i, p_j), \quad (1)$$

where $\{p_1, p_2, K, p_N\}$ are the points on continuous line l.

Degree of curving—We calculated the degree of curving of each line as $$\text{Degree of curving}(l) = \text{Length Span}(l)/N, \quad (2)$$

where N is the number of points on continuous line l.

Figure 12:
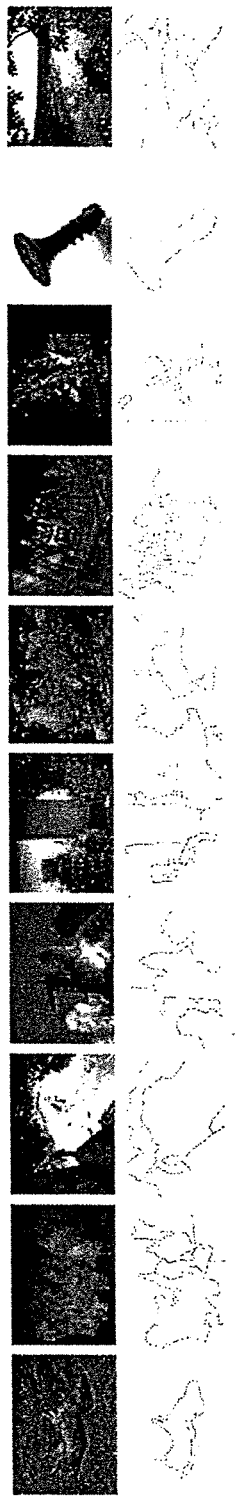
FIG. 12 shows images having a highest degree of curving.
Figure 13:
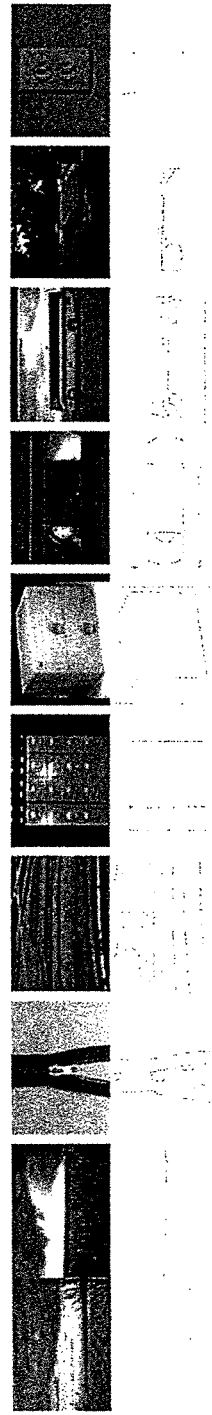
FIG. 13 shows images having a lowest degree of curving.

To capture the statistical characteristics of contiguous lines in the image, we calculated the {statistical measures}. We also generated a 5-bin histogram on the degree of curving of all continuous lines (FIGS. 12 and 13).

Length span—We used {statistical measures} for the length span of all continuous lines.

Line count—We counted the total number of continuous lines, the total number of open lines, and the total number of closed lines in the image.

Curves

We used the nature of curves to model the roundness of images. For each curve, we calculated the extent of fit to an ellipse as well as the parameters of the ellipse such as its area, circularity, and mass of curves. The curve features are explained in detail below.

Fitness, area, circularity—The fitness of an ellipse refers to the overlap between the proposed ellipse and the curves in the image. The area of the fitted ellipse is also calculated. The circularity is represented by the ratio of the minor and major axes of the ellipses. The angular orientation of the ellipse is also measured. For each of the measures, we used the {statistical measures} and entropies of the histograms as the features to depict the roundness of the image.

Mass of curves—We used the mean value and standard deviation of {x, y} coordinates to describe the mass of curves.

Top round curves—To make full use of the discovered curves and to depict roundness, we included the fitness, area, circularity, and mass of curves for each of the top three curves.

To examine the relationship between curves and positive-negative images, we calculated the average number of curves in terms of values of circularity and fitness on positive images (i.e., the value is higher than 6 in the dimension of valance) and negative images (i.e., the value is lower than 4.5 in the dimension of valance).

The results are shown in Tables II and III. Positive images have more curves with 60%-100% fitness to ellipses and higher average curve count.

TABLE II

Average number of curves in terms of the value of fitness in positive and negative images.

|  | (0.8, 1] | (0.6, 0.8] | (0.4, 0.6] | (0.2, 0.4] |
|---|---|---|---|---|
| Positive imgs | 2.12 | 9.33 | 5.7 | 2.68 |
| Negative imgs | 1.42 | 7.5 | 5.02 | 2.73 |

TABLE III

Average number of curves in terms of the value of circularity in positive and negative images.

|  | (0.8, 1] | (0.6, 0.8] | (0.4, 0.6] | (0.2, 0.4] |
|---|---|---|---|---|
| Positive imgs | 0.96 | 2.56 | 5.1 | 11.2 |
| Negative imgs | 0.73 | 2.19 | 4 | 9.75 |

Experiments

To demonstrate the relationship between proposed shape features and the felt emotions, the shape features were utilized in three tasks. First, we distinguished images with strong emotional content from emotionally neutral images. Second, we fit valence and arousal dimensions using regression methods. We then performed classification on discrete emotional categories. The proposed features were compared with the features discussed in Machajdik et al. [18], and overall accuracy was quantified by combining those features. Forward selection and Principal Component Analysis (PCA) strategies were employed for feature selection and to find the best combination of features.

Dataset

We used two subsets of the IAPS [15] dataset, which were developed by examining human affective responses to color photographs with varying degrees of emotional content. The TAPS dataset contains 1,182 images, wherein each image is associated with an empirically derived mean and standard deviation of valance, arousal, and dominance ratings.

Subset A of the TAPS dataset includes many images with faces and human bodies. Facial expressions and body language strongly affect emotions aroused by images, slight changes of which might lead to an opposite emotion. The proposed shape features are sensitive to faces hence we removed all images with faces and human bodies from the scope of this study. In experiments, we only considered the remaining 484 images, which we labeled as Subset A}. To provide a better understanding of the ratings of the dataset, we analyzed the distribution of ratings within valence and arousal, as shown in FIGS. 14A and 14B. We also calculated average variations of ratings in each rating unit (i.e., 1-2, 2-3, . . . , 7-8). Valence ratings between 3 and 4, and 6 and 7, have the maximum variance for single images. Similarly, arousal ratings between 4 and 5 varied the most.

Subset B are images with category labels (with discrete emotions), generated by Mikels [19]. Subset B includes eight categories namely, anger, disgust, fear, sadness, amusement, awe, contentment, and excitement, with 394 images in total. Subset B is a commonly used dataset, hence we used it to benchmark our classification accuracy with the results mentioned in Machajdik et al. [18].

Identifying Strong Emotional Content

Images with strong emotional content have very high or very low valance and arousal ratings. Images with values around the mean values of valance and arousal lack emotions and were used as samples for emotionally neutral images.

Based on dimensions of valance and arousal respectively, we generated two sample sets from Subset A. In Set 1, images with valence values higher than 6 or lower than 3.5 were considered images with strong emotional content and the rest to represent emotionally neutral images. This resulted in 247 emotional images and 237 neutral images. Similarly, images with arousal values higher than 5.5 or lower than 3.7 were defined as emotional images, and others as neutral images. With similar thresholds, we obtained 239 emotional images and 245 neutral images in Set 2.

Figures 15A, 15B:
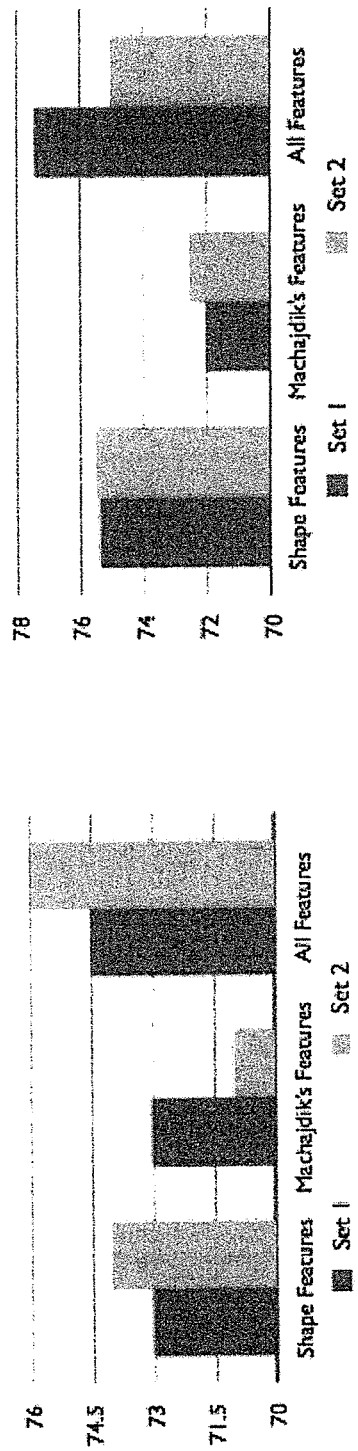
FIGS. 15A and 15B present charts showing the classification accuracy for emotional images and neutral images.

We used the traditional Support Vector Machines (SVM) with radial basis function (RBF) kernel to perform the classification task. We trained SVM models using the proposed shape features, Machajdik's features, and combined (Machajdik's and shape) features. Training and testing were performed by dividing the dataset uniformly into training and testing sets. As we removed all images with faces and human bodies, we did not consider facial and skin features discussed in [18]. We used both forward selection and PCA methods to perform feature selection. In the forward selection method, we used the greedy strategy and accumulated one feature at a time to obtain the subset of features that maximized the classification accuracy. The seed features were also chosen at random over multiple iterations to obtain better results. Our analyses showed that the forward selection strategy achieved greater accuracy for Set 2, whereas PCA performed better for Set 1 (FIGS. 15A-15B). The feature comparison showed that the combined (Machajdik's and shape) features achieved the highest classification accuracy, whereas individually the shape features alone were much stronger than the features from [18] (Machajdik's features). This result is intuitive since emotions evoked by images cannot be well represented by shapes alone and can definitely be bolstered by other image features including their color composition and texture.

By analyzing valence and arousal ratings of the correctly classified images, we observed that very complex/simple, round and angular images had strong emotional content and high valence values. Simple structured images with very low degrees of curving also tends to portray strong emotional content as well as to have high arousal values. By analyzing the individual features for classification accuracy we found that line count, fitness, length span, degree of curving, and the number of horizontal lines achieved the best classification accuracy in Set 1. Fitness and line orientation were more dominant in Set 2.

Figure 16:
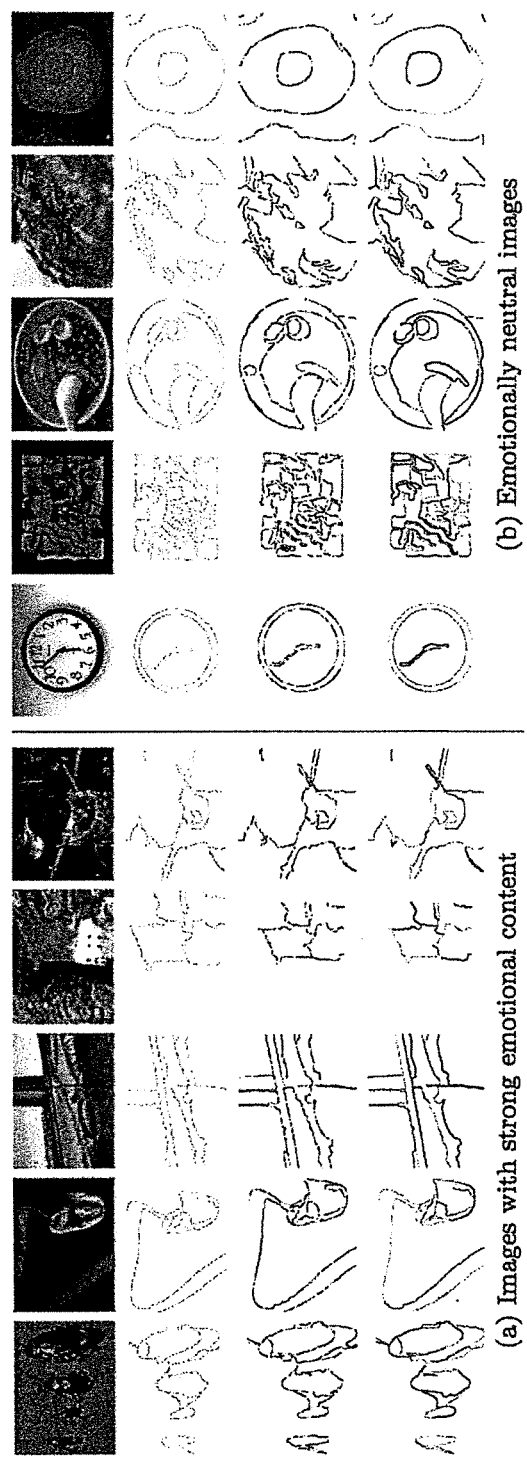
FIG. 16 are examples of misclassification in Set 1. The four rows are original images, image contours, line segments, and continuous lines.
Figure 17:
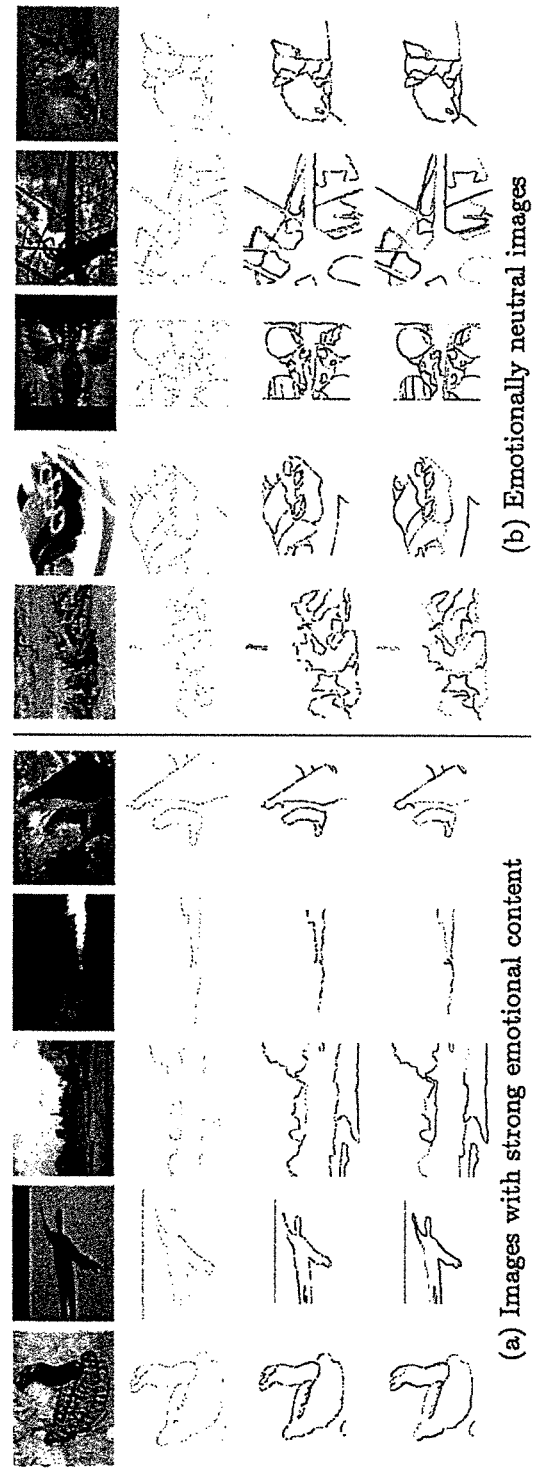
FIG. 17 are examples of misclassification in Set 2. The four rows are original images, image contours, line segments, and continuous lines.

We present a few example images, which were wrongly classified based on the proposed shape features in FIGS. 16 and 17. The misclassification can be explained as a shortcoming of the shape features in understanding the semantics. Some of the images generated extreme emotions based on image content irrespective of the low-level features. Besides the semantics, our performance was also limited by the performance of the contour extraction algorithm.

Fitting the Dimensionality of Emotion

Emotions can be represented by word pairs, as previously done in [23]. However, some emotions are difficult to label. Modeling basic emotional dimensions helps in alleviating this problem. We represented emotion as a tuple consisting of valence and arousal values. The values of valence and arousal were in the range of (1, 9). In order to predict the values of valence and arousal we proposed to learn a regression model for either dimension separately.

Figures 18A, 18B:
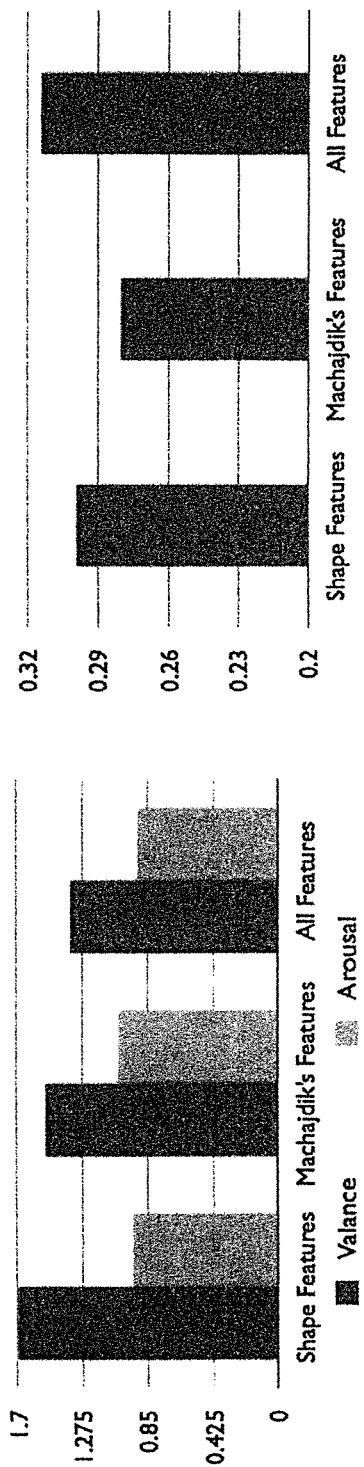
FIG. 18A presents experimental results as Mean squared error for the dimensions of valance and arousal.
FIG. 18B shows accuracy for the classification task.

We used SVM regression with RBF kernel to model the valance and arousal values using shape, Machajdik's features, as well as the combination of features. The mean squared error (MSE) was computed for each of the individual features as well as combined for both valence and arousal values separately. The MSE values are shown in FIG. 18A. These figures show that the valance values were modeled more accurately by Machajdik's features than our shape features. Arousal was well modeled by shape features with a mean squared error of 0.9. However, the combined feature performance did not show any improvements. The results indicated that visual shapes provide a stronger cue in understanding the valence as opposed to the combination of color, texture, and composition in images.

We also computed the correlation between quantified individual shape features and valence-arousal ratings. The higher the correlation, the more relevant the features were. Through this process we found that angular count, fitness, circularity, and orientation of line segments showed higher correlations with valance, whereas angle count, angle metrics, straightness, length span, and orientation of curves had higher correlations with arousal.

Classifying Categorized Emotions

To evaluate the relationship between shape features and emotions on discrete emotions, we classified images into one of the eight categories, anger, disgust, fear, sadness, amusement, awe, contentment, and excitement. We followed Machajdik et al. [18] and performed one-versus-all classification to compare and benchmark our classification accuracy. The classification results are reported in FIG. 18B. We used SVM to assign the images to one of the eight classes. The highest accuracy was obtained by combining Machajdik's with shape features. We also observed a considerable increase in the classification accuracy by using the shape features alone, which proves that shape features indeed capture emotions in images more effectively.

In this experiment, we also built classifiers for each of the shape features. Each of the shape features listed in Table IV achieved a classification accuracy of 30% or higher.

TABLE IV

Significant features to emotions.

| Emotion | Features |
|---|---|
| Angry | Circularity |
| Disgust | Length of line segments |
| Fear | Orientation of line segments and angle count |
| Sadness | Fitness, mass of curves, circularity, and orientation of line segments |
| Amusement | Mass of curves and orientation of line segments |
| Awe | Orientation of line segments |
| Excitement | Orientation of line segments |
| Contentment | Mass of lines, angle count, and orientation of line segments |

An Investigation into Three Visual Characteristics of Complex Scenes that Evoke Human Emotion Prior computational studies have examined hundreds of visual characteristics related to color, texture, and composition in an attempt to predict human emotional responses. Beyond those features, roundness, angularity, and complexity have also been found to evoke emotions in human perceivers, with evidence from psychological studies of facial expressions, dancing poses, and even simple synthetic visual patterns. Capturing these characteristics algorithmically to incorporate in computational studies, however, has proven difficult. Here we expand the scope of previous work by examining these three visual characteristics in computer analysis of complex scenes, and compare the results to the hundreds of visual qualities previously examined.

A large collection of ecologically valid stimuli (i.e., photographs humans regularly encounter on the web), containing more than 40K images crawled from web albums, were generated using crowdsourcing and subjected to human subject emotion ratings. We developed computational methods to map visual content to the scales of roundness, angularity, and complexity as three new computational constructs. Critically, these three new visual constructs achieved comparable classification accuracy to the hundreds of shape, texture, composition, and facial feature characteristics previously examined. In addition, our experimental results showed that color features related most strongly with the positivity of perceived emotions, the texture features related more to calmness or excitement, and roundness, angularity, and complexity related consistently with both dimensions of emotions.

Approach

The EmoSet

To have a large collection of photographs with complex scenes, we crawled more than 50K images from FLICKR, one of the most popular Web albums. We performed human subject study on those photographs and developed a large-scale ecologically valid image stimuli, i.e., The EmoSet. The human subject study was empowered by crowdsourcing and computational tools, where we incorporated those strict psychological procedures into the User Interface (UI) design, in order to recruit a diverse population of human subjects.

As a result, the EmoSet contains 43,837 color images associated with emotional labels, including dimensional labels, categorical labels, and likeliness ratings. Subjects' demographics were also collected such as age, gender, ethnic groups, nationality, educational background, and income level. Besides, we have collected all the semantic tags and other metadata associated with images in the EmoSet. We will publish the EmoSet for non-commercial research upon the publication of the paper.

The Data Collection Approach

Figure 19:
FIG. 19 provides examples of images in the EmoSet.

To collect image stimuli, we took 558 emotional words summarized by Averill [29] and used those words to retrieve images by triggering the FLICKR image search engine (Examples are presented in FIG. 19). For each emotional word, we took the top 100 returned images to ensure a high correlation between images and the query. The crawled images were generated by Web users and contained complex scenes that human may encounter in daily life. We removed duplicate images, images of bad taste, and the ones fully-occupied by text.

The Human Subject Study

In our efforts to establish a large-scale image stimuli, we leveraged crowdsourcing and computational tools, and collect the immediate affective responses from human subjects given the visual stimuli. If subjects needed to refer back to the image, they were allowed to click "Reshow Image" in the upper left part of the screen, and click "Hide" to return to the three parts.

Dataset Statistics

We statistically analyze the EmoSet, including the collected emotional labels and subjects' demographics. Each image in the EmoSet was evaluated by at least three subjects. To reduce low-quality ratings, we removed ratings with viewing duration shorter than 2.5 seconds. The scale of valence, arousal, and dominance is from 1 to 9, the same with the one in IAPS, and the range of likeliness is from 1 to 7, the same rating scale with the widely used photo.net Website. We show the distributions of mean values in valence, arousal, dominance, and likeliness in FIGS. 20A-20D.

The human subject study involved both psychology students within Penn State University and users on the Amazon Mechanical Turk, which ensures a diverse population of emotional ratings. Among the 4148 human subjects we recruited, there were 2236 females and 1912 males, with age ranging from 18 to 72, various ethnic groups including American Indian or Alaska Native, Asian, African American, native Hawaiian or Other Pacific Islander, Hispanic or Latino, and Not Hispanic or Latino. Those human subjects also had various income and education levels.

Constructs of Roundness, Angularity, and Simplicity

To investigate the three visual characteristics of complex scenes that evoke human emotion, this paper proposed computational methods to map images to the scales of roundness, angularity, and complexity as three new computational constructs. We detailed the three constructs in the following sections.

Roundness

Roundness was defined as "the measure of how closely the shape of an object approached that of a circle." [30]. To compute the roundness score of an image, we first segmented the image into regions, then traced their boundaries, and finally computed the goodness of fit to a circle for each region. The step-by-step procedure is:

1) The segmentation approach in [31] was adopted. Suppose the segments are S={S1, S2, . . . , SN}, where the number of segments was automatically determined by the algorithm. Let the set of boundary points of segment Si be Bi={(xj, yj)}.

2) The Pratt Algorithm [32] was applied to find the circle Ci best fitted to Bi. Denote the center of the circle by (ci, di) and radius by ui. The Pratt Algorithm was applied because of its capacity to fit incomplete circles, i.e., arcs of any degree.

3) For each segment, we defined the roundness disparity of Si by ri=σ(d(Bi, Ci)). Denote by d(Bi, Ci) a set of distance between each point in Bi to Ci, and denote by σ the standard deviation of that set. The distance between a point (xi, yi) and a circle Ci was computed by the absolute difference between the radius ui and the Euclidean distance from the point to the center of the circle.

4) The roundness disparity of an image I was denoted by rI=minNrie−λri/max(v,h). Denote by v the number rows and h the number of columns of the image I.

Figure 21:
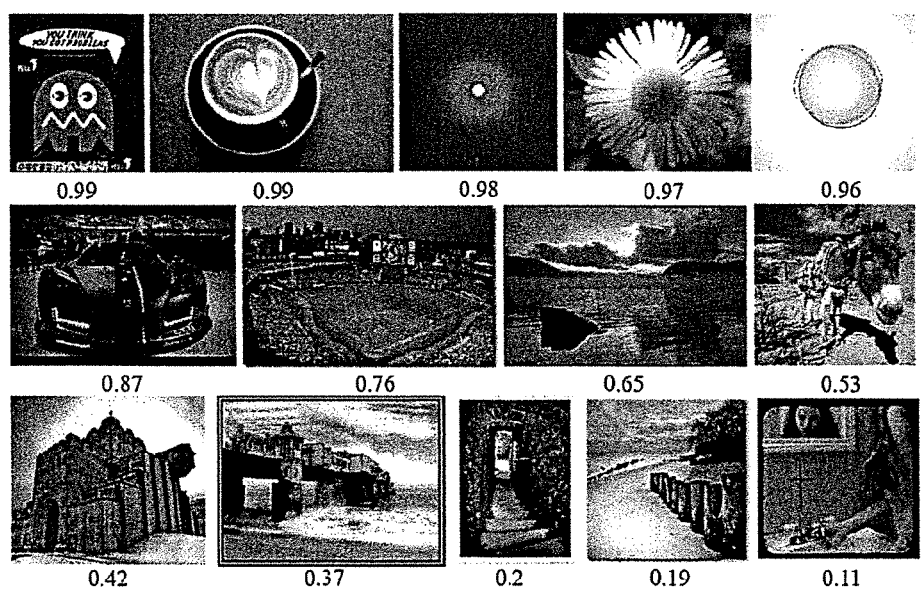
FIG. 21 gives examples of images and their scores of roundness.
Figure 20A:
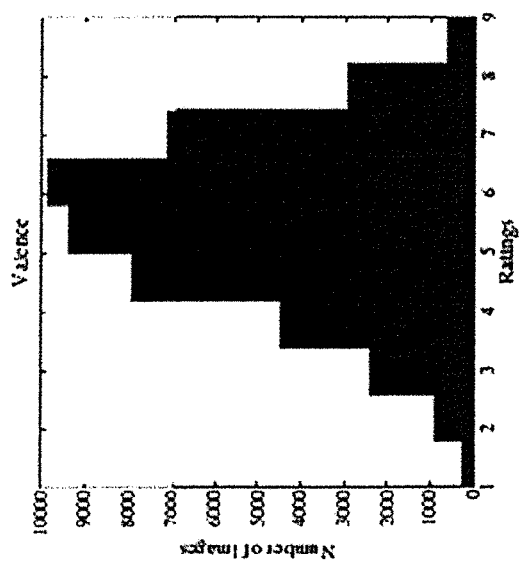
FIGS. 20A-20D show mean value distributions of valence, arousal, dominance, and likeliness in the EmoSet.
Figure 20B:
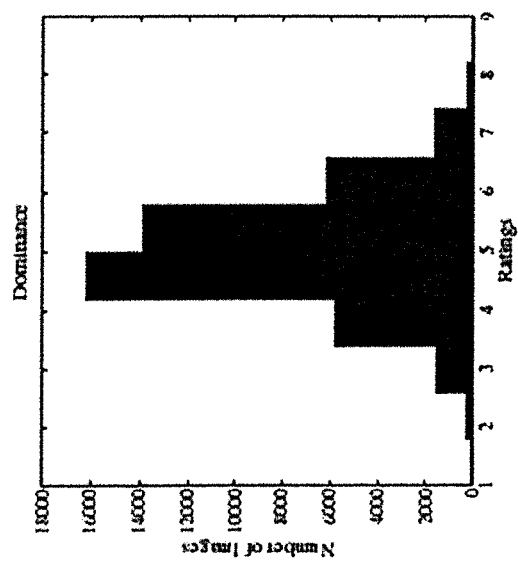
Figure 20C:
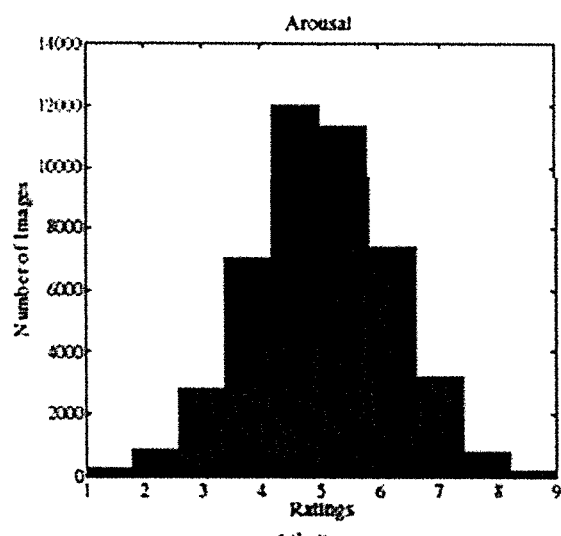
Figure 20D:
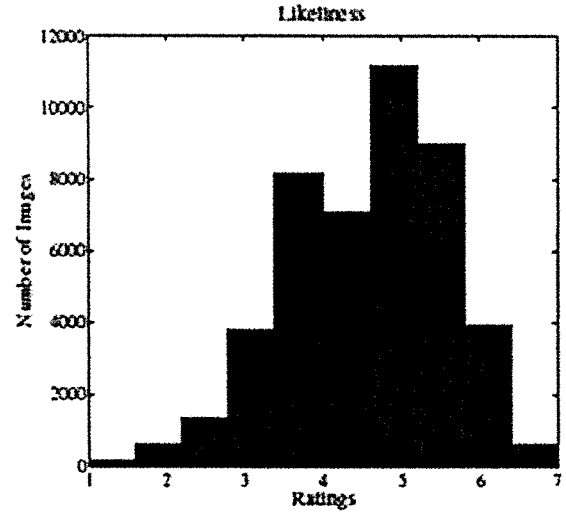

In the experiments, we set λ=0.5, and normalized the roundness disparity values to [0, 1] and set the roundness score to be 1−rI. Hence the closer rI was to 1 meant that the image was associated with an obvious round property and 0 the opposite. We present examples of images and their roundness scores in FIG. 21. The images with highest roundness scores were shown in the first row; images with medium ranges of roundness scores in the second row; and images with lowest roundness scores in the third row.

Angularity

In the Merriam-Webster dictionary, angularity is defined as "the quality of being angular", and angular is explained as being lean and having prominent bone structure. We also interviewed five subjects, including one undergraduate student, three graduate students, and one faculty member. The faculty member remarked that angular images in his mind referred to "sword-like" images. The college student said that tall buildings/architectures with angular shapes reflected his perception of angularity. The three graduate students gave examples such as streets, cubics, and tall and lean buildings. These clues motivated us to examine how similar object boundaries are to long ellipses. Similarly as with roundness, an image was segmented into regions, for each of which an angularity measure was computed.

We approximated the quality of being lean and having prominent bone structure by the elongatedness of fitted ellipses. Specifically, the angularity score of an image was computed as follows:

1) For each set Bi, least-squares criterion was used to estimate the best fit to an ellipse Ei. Denote the center of the ellipse by (ci, di), semimajor axis by mi, semiminor axis by ni, and angle of the ellipse by ei.

2) For each image segment Si, denote the angularity of region i by ai=mi/ni. As our goal is to find lean ellipses, we omitted horizontal and vertical ellipses according to ei. So did ellipses that were too small.

3) We computed angularity of the image I, denote by aI=maxN ai.

Figure 22:
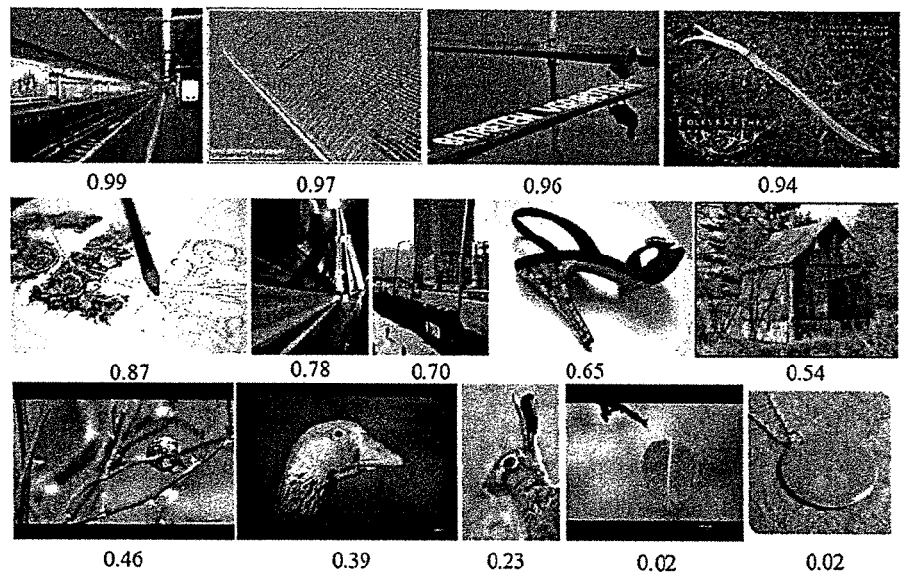
FIG. 22 provides examples of images and their scores of angularity.
Figure 23:
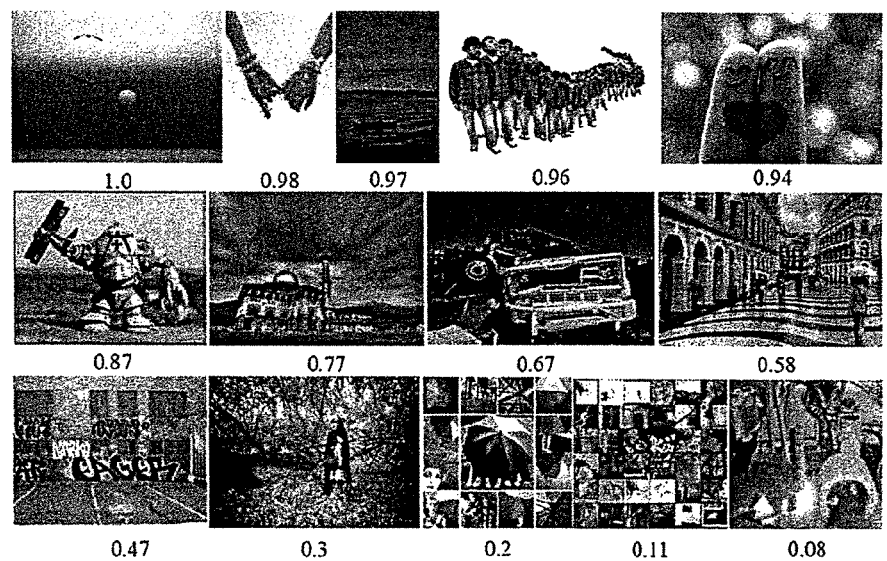
FIG. 23 illustrates examples of images and their scores of simplicity.

Angularity scores for images in the EmoSet were computed and normalized to [0, 1]. The closer aI was to 1 meant that the image showed an obvious angular property. Examples of images and their angularity scores are presented in FIG. 22.

Simplicity

According to [3], simplicity (complexity) of an image is primarily depending on two objective factors: Minimalistic structures that are used in a given representation and the simplest way of organizing these structures. Motivated by such concept, we used the number of segments in an image as an indication for its simplicity. We defined the simplicity (complexity) score by si=|S| and normalized the scores to [0, 1] for images in the EmoSet. The simplicity and complexity were essentially represented by the same construct, we thus omitted complexity in the later presentations. We present examples of images and their scores of simplicity (complexity) in FIG. 26.

Findings

In this section, we present the three major findings of the study, i.e., statistical correlations between roundness, angularity, and simplicity and human emotion (Statistical Correlations), the capacity of the three constructs in classifying the positivity of perceived emotion (The Three Constructs), and the power of various visual features in classifying the positivity and calmness of perceived emotion (Visual Characteristics).

Whereas psychological conventions treated roundness and angularity as opposite properties, some natural photographs showed neither of the properties. As the goal of the study is to examine the capabilities of roundness, angularity, and simplicity in evoking human emotion, we targeted visual stimuli with at least a non-zero construct of roundness or angularity. We thus removed 12, 158 images from the EmoSet where they are associated with zero constructs of both roundness and angularity, which results in 31,679 images.

Statistical Correlations

Figures 26A, 26B, 26C, 26D:
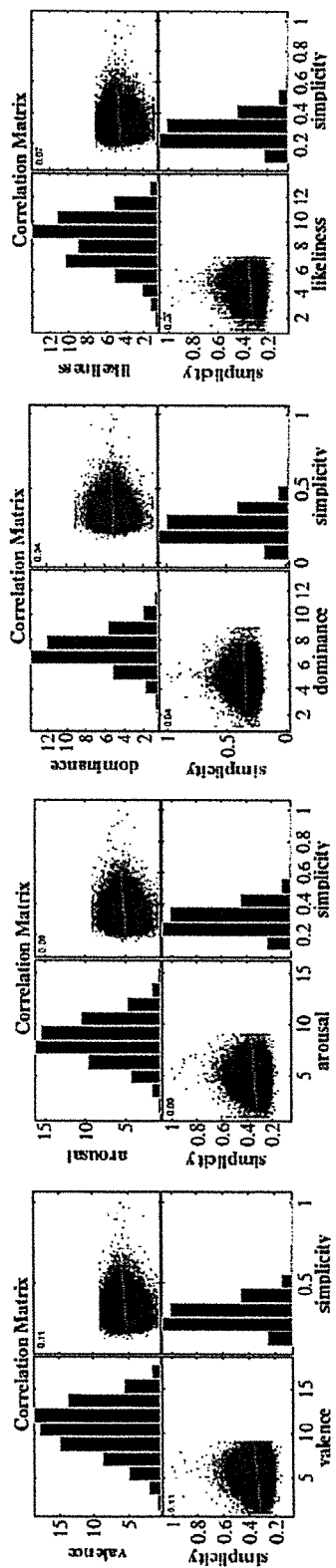
FIGS. 26A-26D show the correlation between simplicity and valence, arousal, dominance, and likeliness in natural photographs.

To examine the intrinsic relationship between the three constructs and evoked emotion, we computed correlations between one construct, such as simplicity, roundness, and angularity, and a dimension of the emotional response, such as valence, arousal, and dominance, and found all the correlations are statistically significant, except the correlation between roundness and likeliness. The results are shown in FIGS. 24, 25, and 26. The red number at the top left corner indicated the statistically significant correlations in terms of p-value.

In particular, the strongest correlation coefficient is between simplicity and valence, i.e., 0.11. The correlation coefficients between simplicity and arousal, dominance, and likeliness are 0.09, 0.04, and 0.07, receptively. Whereas the correlation coefficients are small numerically from a psychological perspective, they are computed on 31, 679 images containing complex back-ground and evaluated in uncontrolled user subject study settings. As the p-value is much smaller than 0.0001, the intrinsic relationships between simplicity and four dimensions of perceived emotions were indicated. Similarly, for angularity, its correlation coefficients with valence, arousal, dominance, and likeliness are 0.05, 0.03, 0.02, and 0.05, and for roundness, results are 0.01, 0.02, 0.02, and −0.01. The correlation coefficients between angularity, roundness and perceived emotion are smaller than simplicity, which implied that the simplicity relates stronger with perceived emotion compared with angularity and roundness on an arbitrary photograph.

TABLE V

Classification Results of High Valence vs. Low Valence

| Features | roundness | angularity | simplicity | 3-constructs | color | color + 3-con | C.T.C.F. + shape | C.T.C.F. + 3-con |
|---|---|---|---|---|---|---|---|---|
| Dimension | 1 | 1 | 1 | 3 | 70 | 73 | 332 | 116 |
| Accuracy(%) | 51.08 | 54.75 | 57.36 | 58.08 | 64.42 | 64.97 | 64.86 | 65.5 |

TABLE VI

Emotion Classification Results

| Features | 3-constructs | color | texture | composition | shape |
|---|---|---|---|---|---|
| Dimension | 3 | 70 | 26 | 13 | 219 |
| Accuracy (valence)(%) | 58.08 | 64.42 | 61.47 | 62.58 | 60.19 |
| Accuracy (arousal)(%) | 56.1 | 58 | 59.55 | 56.15 | 58.7 |

The Three Constructs

To examine the capacity of the three constructs for classifying the emotional responses of natural image stimuli, we formulated a classification task to distinguish positive emotions from negative ones, i.e., high and low valence. The scale of valence is from 1 to 9, where 1 refers to the lowest value in valence and 9 the highest. Images with a medium-range score, such as 5, show neither positive emotions nor negative emotions. Following conventions in computer science that a gap may apply to facilitate classifier training, we adopted a gap of 1.87 to divide image collections into two groups, images arousing positive emotions (valence >6.63) and negative emotions (valence <4.5). To adjust the classifier parameters and evaluate the trained classifier, we randomly divided the data into training, validation, and testing sets, where the number of images with positive and negative emotions was equal. Specifically, we randomly selected 70% of the data used for training, 10% for validation, and 20% for testing. This resulted in 12600 images in training, 1800 images for validation, and 3600 images for testing. The SVM classifier with RBM kernel was applied, as it was one of the best classifier training approaches in computer science. Among the 144 pairs of parameter candidates, the best-performed c and g were selected given their performance on the validation dataset.

Various visual features were used in the classification. Color, texture, facial, and composition features were computed as presented in [18] and shape features were as in Section 4. The three constructs were computed as described in the section on approaches. "3-constructs" refers to the concatenation of the three constructs, and "color+3-con" denotes the concatenation of color features and the three constructs. "C.T.C.F.+3-con" refers to a con-catenation of color, texture, composition, facial, and the three constructs. "C.T.C.F.+shape" refers to the concatenation of color, texture, composition, facial, and shape feature. Results are presented in Table 5. As shown in the Table, the 73 dimensional "color+3-con" feature improved upon the "color" feature slightly. Compared to the 332 dimensional features, "color+3-con" achieved a competitive and even better classification results using low-dimensional features (73 dimensions). We also noticed that the best classification results were achieved by "C.T.C.F.+3-con", which clearly showed the capabilities of roundness, angularity, and simplicity of evoking the positivity or negativity of human emotion.

Visual Characteristics

To examine the visual characteristics of complex scenes of evoking different dimensions of emotion, we classified the calmness of emotions, i.e., high and low arousal following a similar setting with the positivity of emotions. First, a gap was adopted of 2.7 to divide image collections into two groups, high arousal (arousal >6.4) and low arousal (arousal <3.7). Then, training, testing, and validation sets were generated, where 7000 images were used in training, 1000 images for validation, and 2000 images for testing. Finally, the SVM classifier was trained and the best set of parameters was selected according to their performance on the validation set. We compared classification results in valence and arousal using color, texture, composition, shape, and the three constructs. The results were presented in Table 6. As shown in the Tables 5 and 6, color features performed the best among the five feature groups for distinguishing high-valence images from low-valence ones. Texture and shape features performed better at classifying images that aroused calm emotions and excited emotions. The three constructs showed consistent predictability for both of the classification tasks using merely the three numbers as the predictors.

Targeted Applications of Automatic Emotion Prediction

All of the methods and steps disclosed herein are implemented on a programmed digital computer, which may be a stand-alone machine or integrated into another piece of equipment such as a digital still or video camera including, in all embodiments, portable devices such as smart phones. The invention thus finds wide application in many fields of use, including the ability to improve technologies outside digital image interpretation or classification. As one example, the computerized system provides a photographer or a videographer with assessments on the emotions that the viewers can potentially experience while viewing the photos. In this case, the digital images may be acquired by a camera and transferred to a computer over a wired or wireless connection or network for automatic emotion analysis or, alternatively, the computer may be embedded in a still or video camera enabling the photographer or videographer to assess emotional content before or after storage in a memory device in the camera. The embedded computer may also receive non-visual information about the image. The non-visual information may include camera setting parameters and textual information about the image. The emotional content of the image may be obtained based upon the modeled shape features and one or both of the extracted visual features and non-visual information.

In other applications, the computer system evaluates images or videos to predict whether the viewers will experience positive or negative emotions, and how strong those emotions are. Such images may be advertising images, political campaign images, movies or movie trailers, and so forth. A movie director may use the computer system to estimate the emotional response of the audience for a video clip; the computer system can assist political campaign designers develop visual elements such as images or videos that can evoke certain feelings in viewers. Product designers can use the computer system to estimate the emotional response of shoppers based on the visual appearance of the product. In cases such as these, the invention extends, improves upon and/or enhances fields of endeavor outside digital image interpretation, including advertising, marketing, sales, politics and fundraising.

The invention may be coupled to a search engine, thereby providing emotion assessment to rank visual search results so that images or videos of certain emotions can be presented to the users. In this instance, the search engine, running on a computer or portable electronic device such as a smart phone, may include an input from a user indicating the type or strength of emotional content associated with a desired search, with the results reflecting that filter. A teacher of young kids can illustrate architectural or natural attractions using the most beautiful pictures retrieved by a search engine capable of ranking aesthetics.

In social media, the computer system can help users select photos or videos that evoke a desired emotion to share with other users. Particularly when integrated into a still/video camera, including smart phone embodiments, the system may provide photo or video editing software operative to suggest photo or video variants (e.g., cropping, color variations, filtering) to evoke certain desired emotions on the viewers. Such suggestions may be provided before or after image capture; for example, the user of a camera may be allowed to pan/tilt/zoom while watching a display indicating emotional content, thereby enabling the user to begin recording if/when a desired emotional response is achieved.

The invention may also be used to modify and/or improve upon application areas related to sociology, psychiatry and the like. As one example, a clinical psychologist can ask the computer to pick out a sequence of photographs or videos with a certain emotional characteristics for use in a therapeutic session. In the fields of robotics, machine vision and vehicular control, a computer programmed in accordance with the invention may be used to estimate a human user's emotional state based on the visual scene the human is experiencing, and provide corresponding communication such as a dialogue with the human user. A route planning or navigation program can provide users with a route that would evoke certain emotions. For example, a passenger of vehicle, including an autonomous vehicle, may request a route that provides high positive emotions or particular kinds of emotions such as contentment or pleasure.

Interior designers, architects, stage designers and builders may enlist the help of the computer when trying to pick out groups of photographs for proposed constructions or decorations so as to improve the moods exposed individuals (e.g., patients in a hospital, workers in an office building, city visitors, theatregoers).

CONCLUSIONS

We investigated the computability of emotion through shape modeling. To achieve this goal, we first extracted contours from complex images, and then represented contours using lines and curves extracted from images. As we discussed above, we extracted locally optimized line segments by connecting neighboring pixels from the contours extracted from the image and formed lines and curves using the locally optimized line segments. The formed lines and curves are locally meaningful. Statistical analyses were conducted on locally meaningful lines and curves to represent the concept of roundness, angularity, and simplicity, which have been postulated as playing a key role in evoked emotion for years. Leveraging the computational representation of these physical stimulus properties, we evaluated the proposed shape features through three tasks: distinguishing emotional images from neutral images; classifying images according to categorized emotions; and fitting the dimensionality of emotion based on proposed shape features. We have achieved an improvement over the state-of-the-art solution [18]. We also attacked the problem of modeling the presence or absence of strong emotional content in images, which has long been overlooked. Separating images with strong emotional content from emotionally neutral ones can aid in many applications including improving the performance of keyword based image retrieval systems. We empirically verified that our proposed shape features indeed captured emotions in the images. The area of understanding emotions in images is still in its infancy and modeling emotions using low-level features is the first step toward solving this problem. We believe our contribution takes us closer to understanding emotions in images. In the future, we hope to expand our experimental dataset and provide stronger evidence of established relationships between shape features and emotions.

Building upon the shape features, we have also investigated three visual characteristics of complex scenes that evoked human emotion utilizing a large collection of ecologically valid image stimuli. Three new constructs were developed that mapped the visual content to the scales of roundness, angularity, and simplicity. Results of correlational analyses, between each construct and each dimension of emotional responses, showed that some of the correlations are statistically significant, e.g., simplicity and valence, angularity and valence. And classification results demonstrated the capacity of the three constructs in classifying both dimensions of emotion. Interestingly, by combining with color features, the three constructs showed comparable classification accuracy on distinguishing positive emotions from negative ones as a set of 200 texture, composition, facial, and shape features. As future work, the proposed approach could be easily applied to examine other visual characteristics that evoke human emotion in complex scenes. We expect that our efforts may contribute to research regarding visual characteristics of complex scenes and human emotion from perspectives of visual arts, psychology, and computer science.

REFERENCES

[1] P. Arbelaez, M. Maire, C. Fowlkes, and J. Malik. Contour detection and hierarchical image segmentation. *IEEE TPAMI*, 33(5):898-916, 2011.

[2] S. Arifin and P. Y. K. Cheung. A computation method for video segmentation utilizing the pleasure-arousal-dominance emotional information. In *ACM MM*, pages 68-77, 2007.

[3] R. Arnheim. *Art and visual perception: A psychology of the creative eye*. 1974.

[4] J. Aronoff. How we recognize angry and happy emotion in people, places, and things. *Cross-Cultural Research*, 40(1):83-105, 2006.

[5] M. Bar and M. Neta. Humans prefer curved visual objects. *Psychological Science*, 17(8):645-648, 2006.

[6] M. M. Bradley and P. J. Lang. The international affective picture system (IAPS) in the study of emotion and attention. In *Handbook of Emotion Elicitation and Assessment*, pages 29-46, 2007.

[7] S. Brandt, J. Laaksonen, and E. Oja. Statistical shape features in content-based image retrieval. In *ICPR*, pages 1062-1065, 2000.

[8] A. Chia, D. Rajan, M. Leung, and S. Rahardja. Object recognition by discriminative combinations of line segments, ellipses and appearance features. *IEEE TPAMI*, 34(9):1758-1772, 2011.

[9] G. Csurka, S. Skaff, L. Marchesotti, and C. Saunders. Building look & feel concept models from color combinations. *The Visual Computer*, 27(12):1039-1053, 2011.

[10] R. Datta, D. Joshi, J. Li, and J. Z. Wang. Studying aesthetics in photographic images using a computational approach. In *ECCV*, pages 288-301, 2006.

[11] R. Datta, J. Li, and J. Z. Wang. Algorithmic inferencing of aesthetics and emotion in natural image: An exposition. In *ICIP*, pages 105-108, 2008.

[12] A. Hanjalic and L. Q. Xu. Affective video content representation and modeling. *IEEE Trans. On Multimedia*, 7(1):143-154, 2005.

[13] D. Joshi, R. Datta, E. Fedorovskaya, Q. T. Luong, J. Z. Wang, J. Li, and J. Luo. Aesthetics and emotions in images. *IEEE Signal Processing Magazine*, 28(5):94-115, 2011.

[14] P. J. Lang, M. M. Bradley, and B. N. Cuthbert. Emotion, motivation, and anxiety: Brain mechanisms and psychophysiology. *Biological Psychiatry*, 44(12):1248-1263, 1998.

[15] P. J. Lang, M. M. Bradley, and B. N. Cuthbert. International affective picture system: Affective ratings of pictures and instruction manual. In *Technical Report A-8*, University of Florida, Gainesville, Fla., 2008.

[16] M. K. Leung and Y.-H. Yang. Dynamic two-strip algorithm in curve fitting. *Pattern Recognition*, 23(1-2): 69-79, 1990.

[17] K. A. Lindquist, T. D. Wager, H. Kober, E. Bliss-Moreau, and L. F. Barrett. The brain basis of emotion: A meta-analytic review. *Behavioral and Brain Sciences*, 173(4):1-86, 2011.

[18] J. Machajdik and A. Hanbury. Affective image classification using features inspired by psychology and art theory. In *ACM MM*, pages 83-92, 2010.

[19] J. Mikel, B. L. Fredrickson, G. R. Larkin, C. M. Lindberg, S. J. Maglio, and P. A. Reuter-Lorenz. Emotional category data on images from the international affective picture system. *Behavior Research Methods*, 37(4):626-630, 2005.

[20] Y. Mingqiang, K. Kidiyo, and R. Joseph. A survey of shape feature extraction techniques. *Pattern Recognition*, pages 43-90, 2008.

[21] R. Reber, N. Schwarz, and P. Winkielman. Processing fluency and aesthetic pleasure: Is beauty in the perceiver's processing experience? *Personality and Social Psychology Review*, 8(4):364-382, 2004.

[22] H. R. Schiffman. *Sense and Perception: An Integrated Approach*. 1990.

[23] T. Shibata and T. Kato. Kansei image retrieval system for street landscape-discrimination and graphical parameters based on correlation of two image systems. In *International Conference on Systems, Man, and Cybernetics*, pages 274-252, 2006.

[24] M. Solli and R. Lenz. Color based bags-of-emotions. *LNCS*, 5702:573-580, 2009.

[25] H. L. Wang and L. F. Cheong. Affective understanding in film. *IEEE TCSVT*, 16(6):689-704, 2006.

[26] V. Yanulevskaya, J. C. Van Gemert, K. Roth, A. K. Herbold, N. Sebe, and J. M. Geusebroek. Emotional valence categorization using holistic image features. In *ICIP*, pages 101-104, 2008.

[27] H. Zhang, E. Augilius, T. Honkela, J. Laaksonen, H. Gamper, and H. Alene. Analyzing emotional semantics of abstract art using low-level image features. In *Advances in Intelligent Data Analysis*, pages 413-423, 2011.

[28] S. L. Zhang, Q. Tian, Q. M. Huang, W. Gao, and S. P. Li. Utilizing affective analysis for efficient movie browsing. In *ICIP*, pages 1853-1856, 2009.

[29] J. R. Averill, "A semantic atlas of emotional concepts," JSAS: Catalog of Selected Documents in Psychology, vol. 5, no. 330, pp. 1-64, 1975.

[30] M. Mills, Introduction to the measurement of roundness, *Taylor-Hobson Precision*

[31] J. Li, "Agglomerative connectivity constrained clustering for im-age segmentation," *Statistical Analysis and Data Mining*, vol. 4, no. 1, pp. 84-99, 2011.

[32] V. Pratt, "Direct least-squares fitting of algebraic surfaces," *SIG-GRAPH Comput. Graph.*, vol. 21, no. 4, pp. 145-152, 1987.

The invention claimed is:

1. A system for automatically determining emotional content of a digital image using a dimensional space model with valence and arousal coordinates, comprising:

a programmed computer having memory and an input for receiving the digital image from the memory of a device used to capture or store the digital image, wherein the computer is programmed to perform the following functions automatically:

(a) extract visual information from the digital image;

(b) extract shape features in the image to compute computational constructs of visual properties including roundness and angularity and compute the computational constructs; and (c) compute information relating to the emotional content of the digital image using a dimensional space model of emotions with valence and arousal coordinates based upon the extracted shape features, the extracted visual information, or computed computational constructs of visual properties; and an output device in communication with the programmed computer enabling a user to receive the computed information relating to the emotional content of the image, wherein the extracted visual information includes color or texture of the digital image;

wherein the extracted shape features comprise one or more of line segments, continuous lines, angles, or curves;

wherein the roundness in the image is automatically computed by fitting the shape features extracted from the image to a circle characterized by how closely the extracted shape features of the image approaches that of a circle, and wherein the angularity in the image is automatically computed by: a) fitting the shape features extracted from the image to ellipses and measuring an elongatedness of the fitted ellipses, and characterized by maximum elongatedness of the fitted ellipses, or b) a statistical measure of a distribution of angles computed between extracted intersecting line segments, the statistical measure being one of the minimum value, the maximum value, a percentile, the difference between percentiles, the difference between the maximum and minimum values, the total number of angles, the median angle, the mean angle, or a standard deviation of angles.

2. The system of claim 1, wherein:

the programmed computer receives non-visual information about the digital image; and the computer is operative to automatically output information relating to the emotional content of the digital image based upon the computed computational constructs of the visual properties and one or both of the extracted visual information and non-visual information.

3. The system of claim 2, wherein:

the programmed computer forms part of a camera; and the non-visual information includes camera setting parameters.

4. The method of claim 2, further including:

an input for receiving textual information about the digital image; and wherein the non-visual information includes the textual information about the digital image.

5. The system of claim 1, wherein the input is configured to receive a still digital image or a plurality of sequential digital images representing frames in a video or movie.

6. The system of claim 1, wherein the programmed computer is further programmed to automatically use the shape features to distinguish images with strong emotional content from emotionally neutral images.

7. The system of claim 1, wherein the computed computational constructs of the visual properties further include simplicity based upon on one or more shapes extracted from the digital image.

8. The system of claim 7, wherein the programmed computer is further programmed to automatically perform the following functions:

identify contours in the digital image;

represent the contours as lines and curves;

perform statistical analyses on the lines and curves to model the visual properties of roundness, angularity, and simplicity.

9. The system of claim 7, wherein the simplicity is characterized as a simplicity score computed by a number of segments in the digital image.

* * * * *